US012474648B2

(12) United States Patent
Ooyoshi et al.

(10) Patent No.: US 12,474,648 B2
(45) Date of Patent: Nov. 18, 2025

(54) IMAGE FORMING APPARATUS

(71) Applicant: Oki Electric Industry Co., Ltd., Tokyo (JP)

(72) Inventors: Taiga Ooyoshi, Tokyo (JP); Takeshi Kojima, Tokyo (JP)

(73) Assignee: OKI ELECTRIC INDUSTRY CO., LTD., Tokyo (JP)

(*) Notice: Subject to any disclaimer, the term of this patent is extended or adjusted under 35 U.S.C. 154(b) by 524 days.

(21) Appl. No.: 17/986,341

(22) Filed: Nov. 14, 2022

(65) Prior Publication Data

US 2023/0266690 A1 Aug. 24, 2023

(30) Foreign Application Priority Data

Feb. 21, 2022 (JP) ................................ 2022-024804

(51) Int. Cl.
*G03G 9/09* (2006.01)
*G03G 9/087* (2006.01)

(52) U.S. Cl.
CPC ....... *G03G 9/0902* (2013.01); *G03G 9/08755* (2013.01)

(58) Field of Classification Search
CPC ........... G03G 15/0822; G03G 15/0856; G03G 13/013
See application file for complete search history.

(56) References Cited

U.S. PATENT DOCUMENTS

2009/0190957 A1 7/2009 Koido
2020/0341397 A1* 10/2020 Matsumoto .......... G03G 9/0819

FOREIGN PATENT DOCUMENTS

| | | | |
|---|---|---|---|
| EP | 3839634 | A1 | 6/2021 |
| JP | 2019-113783 | A | 7/2019 |
| JP | 2020046651 | A | 3/2020 |

* cited by examiner

*Primary Examiner* — Peter L Vajda
(74) *Attorney, Agent, or Firm* — Rabin & Berdo, P.C.

(57) ABSTRACT

An image forming apparatus includes: a first image forming portion configured to form a brilliant developer image with a brilliant developer; a second image forming portion including at least one image forming portion configured to form a developer image with at least one non-brilliant developer; and a controller configured to control operation of the first image forming portion and the second image forming portion in accordance with received print data. When the controller causes the brilliant developer image to be formed on a medium in accordance with the print data by the first image forming portion, the controller causes a black developer image to be formed between the brilliant developer image and the medium by the second image forming portion.

20 Claims, 8 Drawing Sheets

FIG. 9

| SILVER DEVELOPER DEPOSITION AMOUNT [mg/cm²] | BLACK DEVELOPER PRINT IMAGE DENSITY [%] | ΔY | ΔY EVALU-ATION | FI VALUE | FI VALUE EVALU-ATION | COMPRE-HENSIVE EVALU-ATION |
|---|---|---|---|---|---|---|
| 0.09 | 0 | 8.9 | POOR | 7.5 | POOR | POOR |
| 0.09 | 25 | 28.0 | POOR | 7.9 | POOR | POOR |
| 0.09 | 30 | 33.8 | GOOD | 7.7 | POOR | POOR |
| 0.09 | 35 | 36.1 | POOR | 7.5 | POOR | POOR |
| 0.13 | 0 | 12.0 | POOR | 9.3 | GOOD | POOR |
| 0.13 | 25 | 27.4 | POOR | 9.8 | GOOD | POOR |
| 0.13 | 30 | 33.2 | GOOD | 9.4 | GOOD | GOOD |
| 0.13 | 35 | 34.7 | GOOD | 8.1 | GOOD | GOOD |
| 0.13 | 40 | 40.0 | POOR | 7.7 | POOR | POOR |
| 0.19 | 0 | 14.6 | POOR | 11.5 | GOOD | POOR |
| 0.19 | 25 | 29.8 | POOR | 9.3 | GOOD | POOR |
| 0.19 | 30 | 34.2 | GOOD | 8.5 | GOOD | GOOD |
| 0.19 | 35 | 36.6 | POOR | 8.4 | GOOD | POOR |
| 0.24 | 0 | 20.3 | POOR | 15.8 | GOOD | POOR |
| 0.24 | 20 | 29.4 | POOR | 9.9 | GOOD | POOR |
| 0.24 | 25 | 31.0 | GOOD | 9.0 | GOOD | GOOD |
| 0.24 | 30 | 36.9 | POOR | 8.7 | GOOD | POOR |
| 0.35 | 0 | 22.1 | POOR | 10.3 | GOOD | POOR |
| 0.35 | 15 | 27.9 | POOR | 8.2 | GOOD | POOR |
| 0.35 | 20 | 31.9 | GOOD | 7.0 | POOR | POOR |
| 0.35 | 25 | 34.0 | GOOD | 7.9 | POOR | POOR |
| 0.35 | 30 | 38.0 | POOR | 7.5 | POOR | POOR |
| 0.40 | 0 | 24.2 | POOR | 6.0 | POOR | POOR |

FIG. 10

| BLACK DEVELOPER PRINT IMAGE DENSITY [%] | BLACK DEVELOPER DEPOSITION AMOUNT [mg/cm$^2$] | LIGHTNESS | DENSITY |
|---|---|---|---|
| 5 | 0.002 | 93.49 | 0.08 |
| 10 | 0.007 | 91.03 | 0.11 |
| 15 | 0.008 | 89.85 | 0.12 |
| 20 | 0.013 | 86.94 | 0.16 |
| 25 | 0.016 | 85.06 | 0.18 |
| 30 | 0.023 | 80.44 | 0.24 |
| 35 | 0.031 | 79.18 | 0.26 |
| 40 | 0.053 | 73.76 | 0.34 |
| 45 | 0.062 | 72.86 | 0.35 |
| 50 | 0.082 | 67.82 | 0.42 |

FIG. 11

| SILVER DEVELOPER DEPOSITION AMOUNT [mg/cm$^2$] | BLACK DEVELOPER PRINT IMAGE DENSITY [%] | ΔY | ΔY EVALU-ATION | FI VALUE | FI VALUE EVALU-ATION | COMPRE-HENSIVE EVALU-ATION | DEVELOPER DEPOSITION AMOUNT RATIO |
|---|---|---|---|---|---|---|---|
| 0.13 | 25.0 | 27.3 | POOR | 10.0 | GOOD | POOR | 0.10 |
| 0.13 | 27.5 | 30.0 | GOOD | 9.7 | GOOD | GOOD | 0.14 |
| 0.13 | 30.0 | 33.2 | GOOD | 9.4 | GOOD | GOOD | 0.17 |
| 0.13 | 35.0 | 34.7 | GOOD | 8.1 | GOOD | GOOD | 0.19 |
| 0.13 | 36.3 | 36.0 | GOOD | 8.1 | GOOD | GOOD | 0.23 |
| 0.13 | 40.0 | 40.0 | POOR | 7.7 | POOR | POOR | 0.38 |
| 0.19 | 25.0 | 29.8 | POOR | 9.3 | GOOD | POOR | 0.085 |
| 0.19 | 25.2 | 30.0 | GOOD | 9.1 | GOOD | GOOD | 0.091 |
| 0.19 | 30.0 | 34.2 | GOOD | 8.5 | GOOD | GOOD | 0.12 |
| 0.19 | 31.6 | 36.0 | GOOD | 8.4 | GOOD | GOOD | 0.17 |
| 0.19 | 35.0 | 36.6 | POOR | 8.4 | GOOD | POOR | 0.17 |
| 0.24 | 20.0 | 29.4 | POOR | 9.9 | GOOD | POOR | 0.054 |
| 0.24 | 20.4 | 30.0 | GOOD | 9.6 | GOOD | GOOD | 0.068 |
| 0.24 | 25.0 | 31.0 | GOOD | 9.0 | GOOD | GOOD | 0.072 |
| 0.24 | 29.0 | 36.0 | GOOD | 8.9 | GOOD | GOOD | 0.10 |
| 0.24 | 30.0 | 36.9 | POOR | 8.7 | GOOD | POOR | 0.11 |

IMAGE FORMING APPARATUS

BACKGROUND OF THE INVENTION

1. Field of the Invention

The present disclosure relates to an image forming apparatus, and is preferably applied to, for example, an electrophotographic printer.

2. Description of the Related Art

Conventionally, there are widely used image forming apparatuses (or printers) that perform printing processes by forming developer images (or toner images) with developers (or toners) by means of image forming units on the basis of images supplied from computers or the like, transferring the developer images onto media, such as paper, and fixing them by applying heat and pressure.

Developers include ones, such as silver developers, that contain brilliant pigments, such as aluminum, for the purpose of providing brilliance or other purposes. There is a technique of forming a high-quality brilliant image with a brilliant toner containing a brilliant pigment by specifying the weight-average molecular weight of the brilliant toner, the particle size of the brilliant pigment, and the content of the brilliant pigment in the brilliant toner (see, e.g., Japanese Patent Application Publication No. 2019-113783).

In an image forming apparatus that forms a brilliant image with a brilliant developer, it has been desired to produce a high-quality printed image having both a desired metallic luster appearance and a desired color.

SUMMARY OF THE INVENTION

An object of the present disclosure is to provide an image forming apparatus capable of forming an image having both a desired metallic luster appearance and a desired color.

According to an aspect of the present disclosure, there is provided an image forming apparatus including: a first image forming portion configured to form a brilliant developer image with a brilliant developer; a second image forming portion including at least one image forming portion configured to form a developer image with at least one non-brilliant developer; and a controller configured to control operation of the first image forming portion and the second image forming portion in accordance with received print data, wherein when the controller causes the brilliant developer image to be formed on a medium in accordance with the print data by the first image forming portion, the controller causes a black developer image to be formed between the brilliant developer image and the medium by the second image forming portion.

BRIEF DESCRIPTION OF THE DRAWINGS

In the attached drawings:

FIG. 9 is a table showing first evaluation results;

FIG. 10 is a table showing results of measurements of black developer deposition amounts, lightnesses, and densities corresponding to black developer print image densities;

FIG. 11 is a table showing second evaluation results;

DETAILED DESCRIPTION OF THE INVENTION

Embodiments of the present disclosure will now be described with reference to the drawings.

1. Configuration of Image Forming Apparatus

Figure 1:
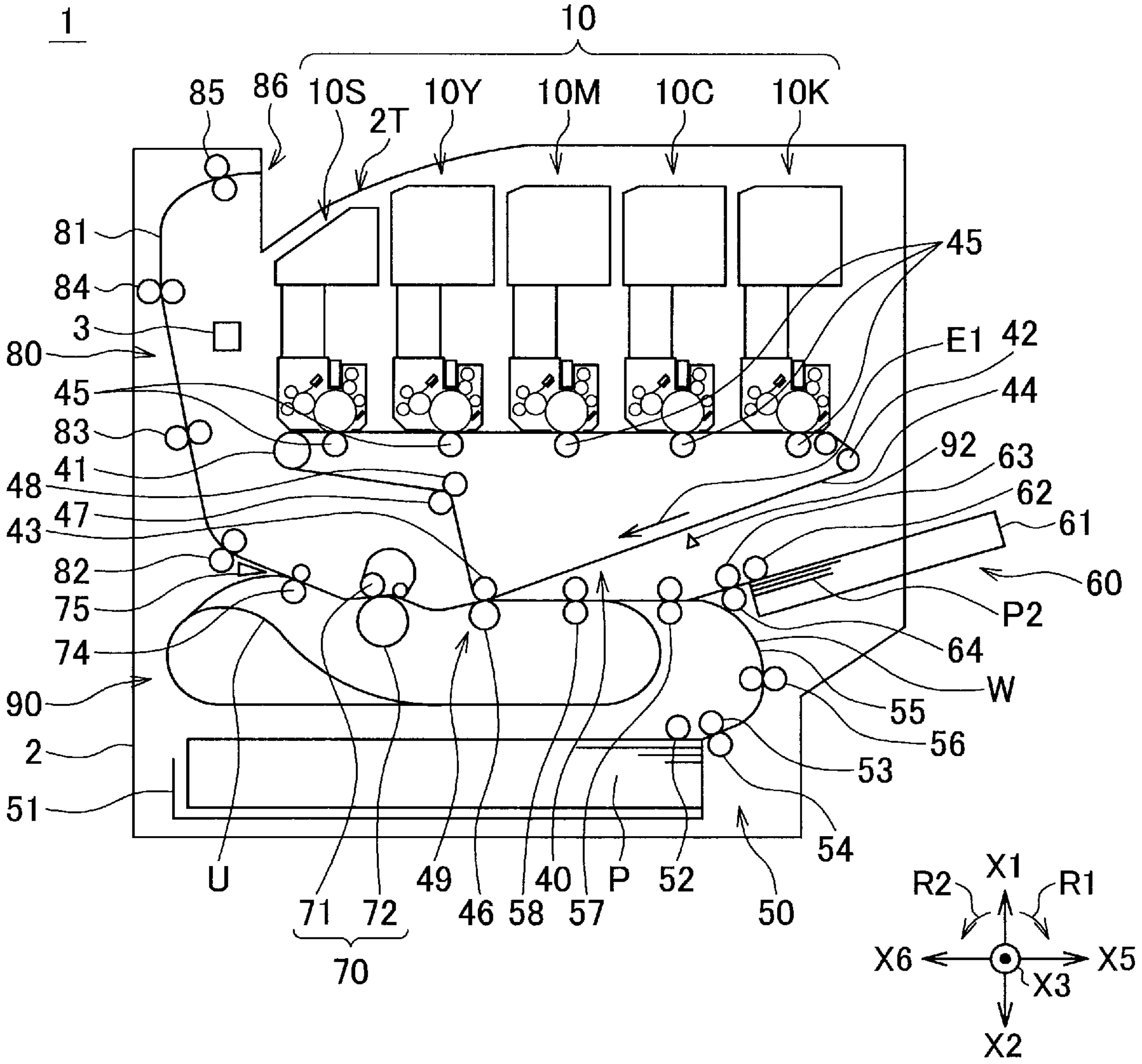
FIG. 1 is a diagram illustrating a configuration of an image forming apparatus.

FIG. 1 illustrates an image forming apparatus 1 according to an embodiment. The image forming apparatus 1 is an electrophotographic color printer, and forms (or prints) a color image on a sheet (e.g., paper sheet) P. The image forming apparatus 1 is a single function printer (SFP) having a printer function but having neither an image scanner function of reading a document nor a communication function using telephone lines.

The image forming apparatus 1 includes a substantially box-shaped housing 2, in which various components are disposed. The following description assumes that the right end of the image forming apparatus 1 in FIG. 1 is a front side of the image forming apparatus 1, and an up-down direction, a left-right direction, and a front-rear direction are those as viewed toward the front side. In the drawings, the upward, downward, leftward, rightward, forward, and rearward directions are indicated by arrows X1, X2, X3, X4, X5, and X6, respectively.

The image forming apparatus 1 includes a controller 3 that entirely controls the image forming apparatus 1. The controller 3 may be processing circuitry. The controller 3 may be or include a processor that executes a program stored in a memory to implement the functions of the controller 3. For example, the controller 3 includes a central processing unit (CPU), a read only memory (ROM), a random access memory (RAM), and the like, which are not illustrated, and performs various processes by reading and executing predetermined programs. Also, the controller 3 is connected wirelessly or by wire to a host apparatus (not illustrated), such as a computer apparatus. Upon receiving, from the host apparatus, image data representing an image to be printed and a command to print the image data, the controller 3 performs a printing process to form a printed image on a surface of a sheet P.

Five image forming units 10K, 10C, 10M, 10Y, and 10S are arranged in this order from the front side toward the rear side, on the upper side of the housing 2. The image forming units 10K, 10C, 10M, 10Y, and 10S correspond to colors of black (K), cyan (C), magenta (M), yellow (Y), and a special color (S), respectively. Although the image forming units 10K, 10C, 10M, 10Y, and 10S correspond to the different colors, they have the same configuration. Also, on the upper side of the housing 2, light emitting diode (LED) heads 14 are disposed to face the image forming units 10K, 10C, 10M, 10Y, and 10S.

The colors of black (K), cyan (C), magenta (M), and yellow (Y), which will be referred to below as common colors, are colors used in common color printers. On the other hand, the special color (S) is a special color such as silver or gold. For convenience of description, the image forming units 10K, 10C, 10M, 10Y, and 10S may be referred to below as image forming units 10.

Figure 2:
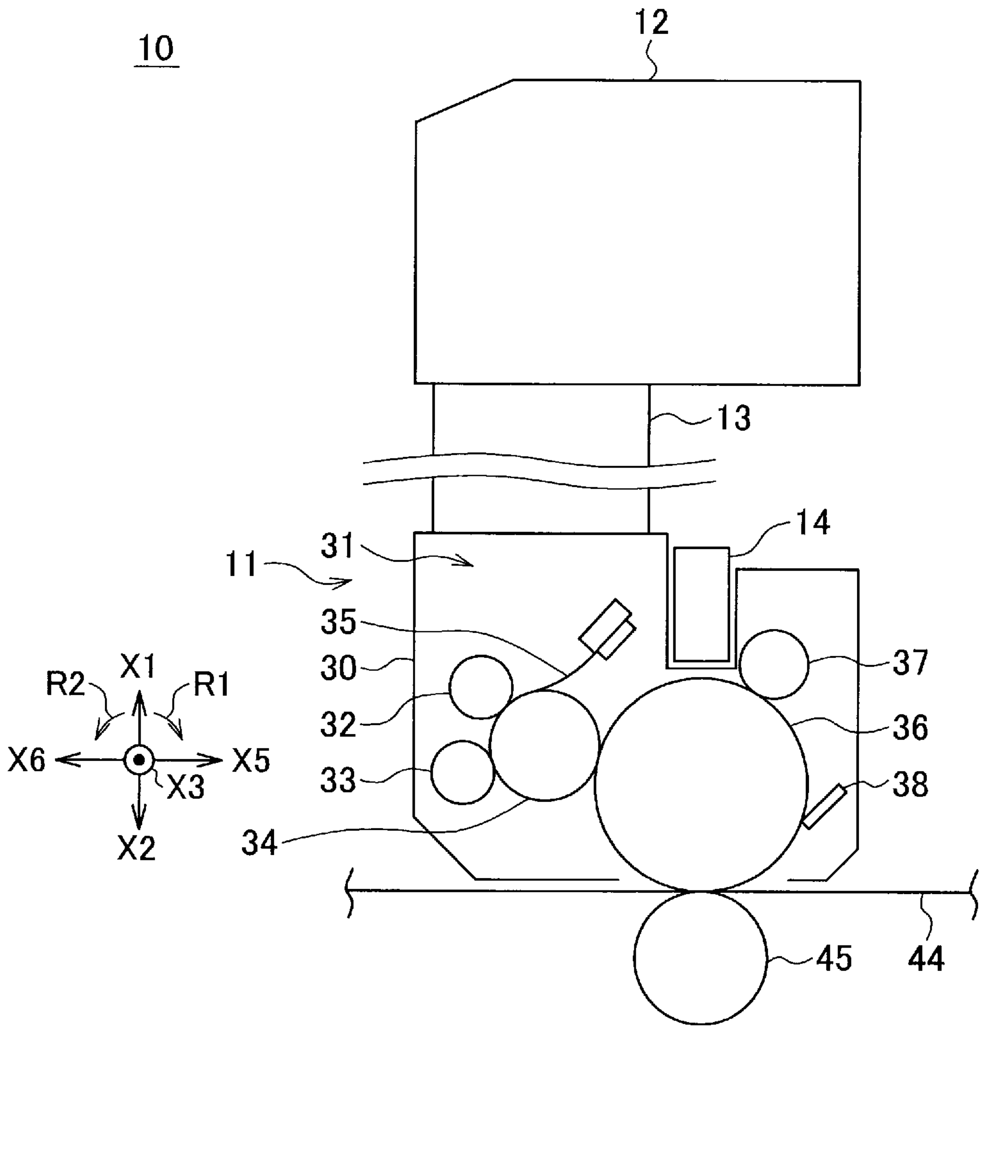
FIG. 2 is a diagram illustrating a configuration of an image forming unit.

As illustrated in FIG. 2, each of the image forming units 10 is generally constituted by an image forming main portion 11, a developer container 12, and a developer supply portion 13. The image forming unit 10 and its components have sufficient lengths in the left-right direction corresponding to the length of the sheet P in the left-right direction. Thus, many of the components are longer in the left-right direction than in the front-rear direction and up-down direction, and formed in shapes elongated in the left-right direction.

The developer container 12 contains developer, and is configured to be attachable to and detachable from the image forming unit 10. When the developer container 12 is attached to the image forming unit 10, it is attached to the image forming main portion 11 via the developer supply portion 13.

Figure 3:
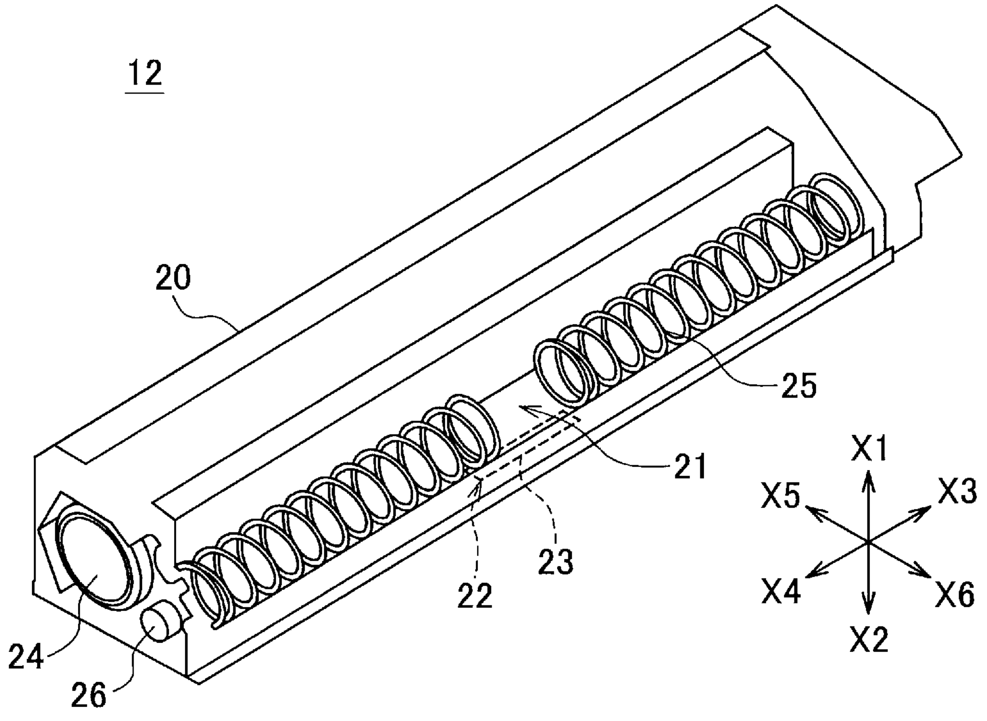
FIG. 3 is a perspective view illustrating a configuration of a developer container.

As illustrated in FIG. 3, the developer container 12 includes a container housing 20 elongated in the left-right direction. A storage chamber 21, which is a cylindrical chamber extending in the left-right direction, is formed in the container housing 20. The storage chamber 21 contains the developer. The developer container 12 may be referred to as a toner cartridge.

The developer container 12 of the image forming unit 10S contains a developer of a color (such as gold or silver) previously selected by a user. In the following description, it is assumed that the developer container 12 of the image forming unit 10S contains a silver developer. As the silver developer, a developer containing a brilliant pigment is used. The developer containers 12 of the image forming units 10K, 10C, 10M, and 10Y contain black, cyan, magenta, and yellow developers, respectively. As the yellow, magenta, cyan, and black developers, developers containing organic pigments, such as a Pigment Yellow, a Pigment Cyan, a Pigment Magenta, and carbon black, are used. For convenience of description, the yellow, magenta, cyan, and black developers will be referred to below as color developers.

Substantially at a center of a bottom of the storage chamber 21 in the left-right direction, a supply opening 22 through which a space in the storage chamber 21 communicates with the external space is formed, and a shutter 23 that opens and closes the supply opening 22 is provided. The shutter 23 is connected to a lever 24, and opens or closes the supply opening 22 in accordance with rotation of the lever 24. The lever 24 is operated by a user when the developer container 12 is attached to or detached from the image forming unit 10.

For example, in a state in which the developer container 12 is not attached to the image forming unit 10 (see FIG. 2), the supply opening 22 is closed by the shutter 23, which prevents the developer contained in the storage chamber 21 from leaking to the outside. When the developer container 12 is attached to the image forming unit 10, the lever 24 is rotated in a predetermined opening direction, thereby moving the shutter 23 to open the supply opening 22. This makes the space in the storage chamber 21 communicate with a space in the developer supply portion 13, and the developer in the storage chamber 21 of the developer container 12 is supplied to the image forming main portion 11 through the developer supply portion 13. Also, when the developer container 12 is detached from the image forming unit 10, the lever 24 is rotated in a predetermined closing direction, thereby moving the shutter 23 to close the supply opening 22.

Also, an agitator 25 is disposed in the storage chamber 21. The agitator 25 is formed in a shape such that an elongated member is spiraled about an imaginary central axis extending in the left-right direction, and is rotatable about the imaginary central axis in the storage chamber 21. An agitator driver 26 is disposed at an end of the container housing 20. The agitator driver 26 is connected to the agitator 25. When the agitator driver 26 is supplied with a driving force from a predetermined drive source disposed in the housing 2 (see FIG. 1), it transmits the driving force to the agitator 25 and rotates the agitator 25. Thereby, the developer container 12 can agitate the developer contained in the storage chamber 21, and prevent the developer from aggregating and feed the developer to the supply opening 22.

The image forming main portion 11 (see FIG. 2) includes an image forming housing 30, a developer storage space 31, a first supply roller 32, a second supply roller 33, a developing roller 34, a developing blade 35, a photosensitive drum 36, a charging roller 37, and a cleaning blade 38. The first supply roller 32, second supply roller 33, developing roller 34, photosensitive drum 36, and charging roller 37 are each formed in a cylindrical shape having a central axis extending in the left-right direction and rotatably supported by the image forming housing 30.

The developer storage space 31 contains the developer supplied from the developer container 12 via the developer supply portion 13. The first supply roller 32 and second supply roller 33 each include an elastic layer that is formed by conductive urethane rubber foam or the like and forms a periphery of the roller. The developing roller 34 includes an elastic layer, a conductive surface layer, or the like forming a periphery of the roller. The developing blade 35 is formed by, for example, a stainless steel sheet having a predetermined thickness, and a part of the developing blade abuts the periphery of the developing roller 34 with the developing blade 35 slightly elastically deformed.

The photosensitive drum 36 includes a thin-film charge generation layer and a thin-film charge transport layer that are sequentially formed and form a periphery of the drum, and is chargeable. The charging roller 37 includes a conductive elastic body that forms a periphery of the roller. The periphery of the charging roller 37 abuts the periphery of the photosensitive drum 36. The cleaning blade 38 is formed by, for example, a thin-plate-shaped resin member, and a part of the cleaning blade 38 abuts the periphery of the photosensitive drum 36 with the cleaning blade 38 slightly elastically deformed.

The LED head 14 is located above the photosensitive drum 36 in the image forming main portion 11. The LED head 14 includes multiple light emitting element chips arranged linearly in the left-right direction, and causes light emitting elements of the light emitting element chips to emit light in a light emitting pattern based on an image data signal supplied from the controller 3 (see FIG. 1).

The image forming main portion 11 is supplied with a driving force from a motor (not illustrated), thereby rotating the second supply roller 33, developing roller 34, and charging roller 37 in the direction of arrow R1 (clockwise in FIG. 2) and rotating the first supply roller 32 and photosensitive drum 36 in the direction of arrow R2 (counterclockwise in FIG. 2). Further, the image forming main portion 11 applies respective predetermined bias voltages to the first supply roller 32, second supply roller 33, developing roller 34, developing blade 35, and charging roller 37 under control of the controller 3, thereby charging them.

Each of the first supply roller 32 and second supply roller 33 is charged to cause the developer in the developer storage space 31 to adhere to its periphery, and is rotated to apply the developer to the periphery of the developing roller 34. The developing blade 35 removes excess developer from the periphery of the developing roller 34 to form a thin layer of developer on the periphery. The periphery of the developing roller 34 with the thin layer of developer formed thereon is brought into contact with the periphery of the photosensitive drum 36.

The charging roller 37 abuts the photosensitive drum 36 while being charged, thereby uniformly charging the periphery of the photosensitive drum 36. The LED head 14 emits light at predetermined time intervals in a light emitting pattern based on an image data signal supplied from the controller 3 (see FIG. 1), thereby sequentially exposing the photosensitive drum 36. Thereby, an electrostatic latent image is sequentially formed on the periphery of the photosensitive drum 36, in the vicinity of the upper end of the photosensitive drum 36.

Then, rotation of the photosensitive drum 36 in the direction of arrow R2 brings the part with the electrostatic latent image formed thereon into contact with the developing roller 34. Thereby, developer adheres to the periphery of the photosensitive drum 36 based on the electrostatic latent image, thereby forming a developer image based on the image data. Further, rotation of the photosensitive drum 36 in the direction of arrow R2 brings the developer image to the vicinity of the lower end of the photosensitive drum 36.

An intermediate transfer unit 40 is disposed below the image forming units 10 in the housing 2 (see FIG. 1). The intermediate transfer unit 40 includes a drive roller 41, a driven roller 42, a backup roller 43, an intermediate transfer belt 44, five primary transfer rollers 45, a secondary transfer roller 46, and a reverse bending roller 47. The drive roller 41, driven roller 42, backup roller 43, primary transfer rollers 45, secondary transfer roller 46, and reverse bending roller 47 are each formed in a cylindrical shape having a central axis extending in the left-right direction and rotatably supported by the housing 2.

The drive roller 41 is disposed behind and below the image forming unit 10S, and rotates in the direction of arrow R1 when being supplied with a driving force from a belt motor (not illustrated). The driven roller 42 is disposed in front of and below the image forming unit 10K. The upper ends of the drive roller 41 and driven roller 42 are located at the same level as or slightly below the lower ends of the photosensitive drums 36 (see FIG. 2) of the respective image forming units 10. The backup roller 43 is disposed in front of and below the drive roller 41 and behind and below the driven roller 42.

The intermediate transfer belt 44 is an endless belt formed by a high-resistance plastic film, and is stretched around the drive roller 41, driven roller 42, and backup roller 43. Further, in the intermediate transfer unit 40, the five primary transfer rollers 45 are disposed under a part of the intermediate transfer belt 44 stretched between the drive roller 41 and the driven roller 42, more specifically, at positions directly under the five image forming units 10 and facing the photosensitive drums 36 with the intermediate transfer belt 44 therebetween. The primary transfer rollers 45 are applied with predetermined bias voltages under control of the controller 3.

The secondary transfer roller 46 is located directly under the backup roller 43 and urged toward the backup roller 43. Thus, in the intermediate transfer unit 40, the intermediate transfer belt 44 is sandwiched between the secondary transfer roller 46 and the backup roller 43. Also, the secondary transfer roller 46 is applied with a predetermined bias voltage. Hereinafter, the secondary transfer roller 46 and backup roller 43 will be collectively referred to as a secondary transfer unit 49.

The reverse bending roller 47 is located in front of and below the drive roller 41 and above and behind the backup roller 43, and urges the intermediate transfer belt 44 forward and upward. Thereby, the intermediate transfer belt 44 is tightly stretched around the rollers. Also, a reverse bending backup roller 48 is disposed in front of and above the reverse bending roller 47 with the intermediate transfer belt 44 therebetween.

The intermediate transfer unit 40 rotates the drive roller 41 in the direction of arrow R1 with a driving force supplied from the belt motor (not illustrated), thereby moving the intermediate transfer belt 44 in a direction along arrow E1. Also, each primary transfer roller 45 rotates in the direction of arrow R1 while being applied with a predetermined bias voltage. Thereby, the image forming units transfer, onto the intermediate transfer belt 44, the developer images that have been brought to the vicinities of the lower ends of the peripheries of the photosensitive drums 36 (see FIG. 2) and sequentially superimpose the developer images of the respective colors. At this time, the developer images of the respective colors are superimposed on a surface of the intermediate transfer belt 44 sequentially from the silver (S) developer image, which is formed on the upstream side. The intermediate transfer unit 40 moves the intermediate transfer belt 44 to convey the developer images transferred from the respective image forming units 10 to the vicinity of the backup roller 43.

A conveying path W, which is a path for conveying the sheet P, is formed in the housing 2 (see FIG. 1). The conveying path W extends forward and upward from the front side of the lower end of the housing 2, makes a half turn, and extends rearward under the intermediate transfer unit 40. Then, the conveying path W extends upward behind the intermediate transfer unit 40 and image forming unit 10S, and extends forward. Thus, the conveying path W is formed in an S-shape in FIG. 1. In the housing 2, various components are disposed along the conveying path W.

A first sheet feeder 50 is disposed in the housing 2 near the lower end of the housing (see FIG. 1). The first sheet feeder 50 includes a sheet cassette 51, a pickup roller 52, a feed roller 53, a retard roller 54, a conveying guide 55, pairs of conveying rollers 56, 57, and 58, and the like. The pickup roller 52, the feed roller 53, the retard roller 54, and the conveying rollers of the pairs 56, 57, and 58 are each formed in a cylindrical shape having a central axis extending in the left-right direction.

The sheet cassette 51 is formed in a hollow rectangular parallelepiped shape, and contains sheets P in a state in which the sheets P are stacked with their surfaces facing in the up-down direction, or in a stacked state. Also, the sheet cassette 51 is attachable to and detachable from the housing 2.

The pickup roller 52 abuts the uppermost surface of the sheets P contained in the sheet cassette 51, near the front end of the uppermost surface. The feed roller 53 is disposed in front of and at a distance from the pickup roller 52. The retard roller 54 is located under the feed roller 53 and forms a gap corresponding to the thickness of a sheet P between the retard roller 54 and the feed roller 53.

When the first sheet feeder 50 is supplied with a driving force from a sheet feed motor (not illustrated), it rotates or stops the pickup roller 52, feed roller 53, and retard roller 54 as appropriate. Thereby, the pickup roller 52 feeds forward one or more uppermost sheets of the sheets P contained in the sheet cassette 51. The feed roller 53 and retard roller 54 further feed forward the uppermost sheet of the sheets P while stopping the other sheets. In this manner, the first sheet feeder 50 separates and feeds forward the sheets P one by one.

The conveying guide 55 is disposed in a front lower part of the conveying path W, and allows the sheet P to move forward and upward and further move rearward and upward along the conveying path W. The pair of conveying rollers 56 is disposed near a center of the conveying guide 55. The pair of conveying rollers 57 is disposed near an upper end of the conveying guide 55. The pairs of conveying rollers 56 and 57 are supplied with driving forces from the sheet feed motor (not illustrated) to rotate in predetermined directions. Thereby, the pairs of conveying rollers 56 and 57 convey the sheet P along the conveying path W.

Also, a second sheet feeder 60 is disposed in front of the pair of conveying rollers 57 in the housing 2. The second sheet feeder 60 includes a sheet tray 61, a pickup roller 62, a feed roller 63, a retard roller 64, and the like. The sheet tray 61 is formed in the shape of a plate that is thin in the up-down direction, and allows sheets P2 to be placed thereon. The sheets P2 placed on the sheet tray 61 are, for example, sheets different in size or quality from the sheets P contained in the sheet cassette 51.

The pickup roller 62, feed roller 63, and retard roller 64 are configured in the same manner as the pickup roller 52, feed roller 53, and retard roller 54 of the first sheet feeder 50, respectively. When the second sheet feeder 60 is supplied with a driving force from the sheet feed motor (not illustrated), it rotates and stops the pickup roller 62, feed roller 63, and retard roller 64 as appropriate, thereby feeding rearward the uppermost sheet of the sheets P2 on the sheet tray 61 while stopping the other sheets. In this manner, the second sheet feeder 60 separates and feeds rearward the sheets P2 one by one. The sheet P2 fed at this time is conveyed by the pair of conveying rollers 57 along the conveying path W similarly to the sheet P. Hereinafter, for convenience of description, sheets P2 will be simply referred to as sheets P without distinguishing the sheets P2 from the sheets P.

The rotation of the pair of conveying rollers 57 is controlled as appropriate. Thereby, the pair of conveying rollers 57 applies a frictional force to the sheet P to correct inclination of the sides of the sheet P relative to the moving direction, i.e., skew of the sheet P, and place the sheet P in a state in which leading and trailing edges of the sheet P are along the left-right direction, and then feeds the sheet P rearward. The pair of conveying rollers 58 is located behind and at a predetermined distance from the pair of conveying rollers 57. The pair of conveying rollers 58 rotates similarly to the pair of conveying rollers 56 and the like, thereby applying a driving force to the sheet P conveyed along the conveying path W and further conveying the sheet P rearward along the conveying path W.

The secondary transfer unit 49, i.e., the backup roller 43 and secondary transfer roller 46, of the intermediate transfer unit 40 is disposed behind the pair of conveying rollers 58.

In the secondary transfer unit 49, the developer images that have been formed by the image forming units 10 and transferred onto the intermediate transfer belt 44 approach the conveying path W with the movement of the intermediate transfer belt 44, and the secondary transfer roller 46 is applied with a predetermined bias voltage. Thus, the secondary transfer unit 49 transfers the developer images from the intermediate transfer belt 44 to the sheet P conveyed along the conveying path W and conveys the sheet P further rearward.

Also, in the image forming apparatus 1, a density sensor 92 is disposed behind and below the driven roller 42. The density sensor 92 detects developer densities of developer images transferred on the surface of the intermediate transfer belt 44, and provides results of the detection to the controller 3. On the basis of the results, the controller 3 performs density correction to correct the respective developer densities of developer images of the respective colors formed by the respective image forming units 10 and feedback controls bias voltages or the like of relevant parts so that the developer densities are desired values.

A fixing unit 70 is disposed behind the secondary transfer unit 49. The fixing unit 70 is constituted by a heating unit 71 and a pressure unit 72 that face each other with the conveying path W therebetween. The heating unit 71 includes a heating belt that is an endless belt, and a heater, multiple rollers, and the like that are disposed inside the heating belt. The pressure unit 72 is a cylindrical pressure roller having a central axis extending in the left-right direction, and presses its upper surface against a lower surface of the heating unit 71 to form a nip portion.

The fixing unit 70 heats the heater of the heating unit 71 to a predetermined temperature and rotates a roller as appropriate to rotate the heating belt in the direction of arrow R1, and rotates the pressure unit 72 in the direction of arrow R2, under control of the controller 3. In this state, when the fixing unit 70 receives the sheet P on which the developer images have been transferred by the secondary transfer unit 49, it nips the sheet P with the heating unit 71 and pressure unit 72, fixes the developer images to the sheet P by applying heat and pressure, and feeds it rearward.

A pair of conveying rollers 74 is disposed behind the fixing unit 70, and a switch 75 is disposed behind the pair of conveying rollers 74. The switch 75 switches the traveling direction of the sheet P to an upward direction or a downward direction, under control of the controller 3. A sheet discharge unit 80 is disposed above the switch 75. The sheet discharge unit 80 includes a conveying guide 81 that guides the sheet P upward along the conveying path W, pairs of conveying rollers 82, 83, 84, and 85 facing each other with the conveying path W therebetween, and the like.

A reconveying unit 90 is disposed below the switch 75, fixing unit 70, secondary transfer unit 49, and the like. The reconveying unit 90 includes a conveying guide and pairs of conveying rollers (not illustrated) that form a reconveying path U, and the like. The reconveying path U extends downward from below the switch 75, extends forward, and then joins the conveying path W on the downstream side of the pair of conveying rollers 57.

When the sheet P is discharged, the controller 3 switches the traveling direction of the sheet P to a direction toward the sheet discharge unit 80, which is the upward direction, by means of the switch 75. The sheet discharge unit 80 conveys the sheet P received from the switch 75 upward, and discharges it to a sheet discharge tray 2T through an outlet 86. Also, when the sheet P is returned, the controller 3 switches the traveling direction of the sheet P to a direction toward the reconveying unit 90, which is the downward direction, by means of the switch 75. The reconveying unit 90 conveys the sheet P received from the switch 75 along the reconveying path U to the downstream side of the pair of conveying rollers 57 and causes the sheet P to be reconveyed along the conveying path W. Thereby, the sheet P is inverted and returned to the conveying path W, which allows the image forming apparatus 1 to perform duplex printing.

As described above, the image forming apparatus 1 forms developer images using the developers in the image forming units 10, transfers the developer images onto the intermediate transfer belt 44, transfers the developer images from the intermediate transfer belt 44 onto a sheet P in the secondary transfer unit 49, and fixes the developer images in the fixing unit 70, thereby printing (or forming) an image on the sheet P. For convenience of description, hereinafter, a developer image formed by the silver developer will be referred to as a silver developer image IS, and a developer image formed by a color developer will be referred to as a color developer image IL.

Figure 4:
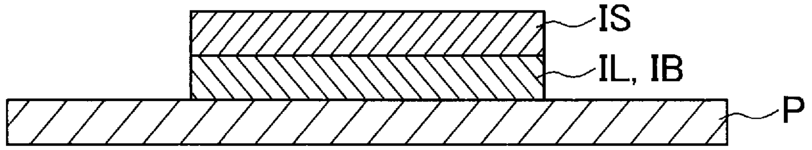
FIG. 4 is a cross-sectional view illustrating a brilliance superimposition developer image transferred on a sheet.

For example, in the image forming apparatus 1, when a silver developer image IS formed with the silver developer and a color developer image IL formed with a color developer are sequentially transferred onto the intermediate transfer belt 44 in the image forming units 10, the developer images are transferred onto a sheet P in the secondary transfer unit 49. Thereby, the sheet P is placed in a state in which the color developer image IL is placed on a surface of the sheet P and the silver developer image IS is superimposed on the color developer image IL, as illustrated in FIG. 4. That is, the sheet P is placed in a state in which the color developer image IL is placed between the sheet P and the silver developer image IS in such a manner as to be superimposed on the silver developer image IS.

Hereinafter, a color developer image IL formed by the black developer will be referred to as a black developer image IB, a color developer image IL formed by the yellow developer will be referred to as a yellow developer image, a color developer image IL formed by the magenta developer will be referred to as a magenta developer image, and a color developer image IL formed by the cyan developer will be referred to as a cyan developer image. Also, hereinafter, a printing process in which a silver developer image IS is superimposed on a black developer image IB will be referred to as a brilliance superimposition printing process, and a printed product obtained by the brilliance superimposition printing process will be referred to as a silver-black printed product. Moreover, hereinafter, a developer image constituted by a black developer image IB and a silver developer image IS superimposed on the black developer image IB will be referred to as a brilliance superimposition developer image. Moreover, hereinafter, a printing process in which a silver developer image IS is formed alone will be referred to as a silver developer printing process, and a printed product obtained by the silver developer printing process will be referred to as a silver printed product.

For each color, the image forming apparatus 1 can increase the amount (referred to below as the on-medium deposition amount or simply as the deposition amount) (to be detailed later) of developer per unit area of a developer image transferred on a sheet P by increasing the absolute value(s) of bias voltage(s) applied to component(s) and decrease the deposition amount by decreasing the absolute value(s) of the bias voltage(s), by control by the controller 3. Also, for each color, the image forming apparatus 1 can increase the deposition amount of a developer image transferred on a sheet P by increasing a print image density (to be detailed later) of the developer image and decrease the deposition amount by decreasing the print image density, by control by the controller 3.

2. Production of Developer

Next, production of the developers contained in the developer containers 12 of the image forming units 10 (see FIG. 2) will be described. In this embodiment, production of the silver developer will be described especially.

In general, developer contains a pigment for exhibiting a desired color, a binder resin for binding the pigment to a medium, such as a sheet P, an external additive for improving the chargeability, and the like. Hereinafter, for convenience of description, a particle containing a pigment and a binder resin will be referred to as a toner base particle (or toner particle), powder consisting of toner base particles will be referred to as toner, and powder containing, in addition to toner, an external additive or the like will be referred to as developer. In this embodiment, since a one-component development system is employed, a particle containing a brilliant pigment and a binder resin is referred to as a brilliant toner base particle (or brilliant toner particle), powder consisting of brilliant toner base particles is referred to as brilliant toner, and powder containing, in addition to brilliant toner, an external additive or the like is referred to as brilliant developer. Similarly, when a two-component development system is employed, a particle containing a brilliant pigment and a binder resin is referred to as a brilliant toner base particle (or brilliant toner particle), powder consisting of brilliant toner base particles is referred to as brilliant toner, and powder containing, in addition to brilliant toner, an external additive is referred to as brilliant developer. In the case of a two-component development system, a first image forming portion (to be described later) containing a brilliant developer may contain a carrier, and a second image forming portion (to be described later) containing a non-brilliant developer may contain a carrier.

In an example, an aqueous medium with an inorganic dispersant dispersed therein is first prepared. Specifically, 600 parts by weight of industrial trisodium phosphate dodecahydrate is mixed with 18400 parts by weight of pure water, and dissolved therein at a liquid temperature of 60° C. Then, the resulting liquid is added with dilute nitric acid for pH (hydrogen-ion exponent) adjustment. The resulting aqueous solution is added with an aqueous calcium chloride solution obtained by dissolving 300 parts by weight of industrial calcium chloride anhydride in 2600 parts by weight of pure water, and is high-speed stirred with a Line Mill (manufactured by Primix Corporation) at a rotation speed of 3566 rpm for 50 minutes while being maintained at a liquid temperature of 60° C. Thereby, an aqueous phase that is an aqueous medium with a suspension stabilizer (or inorganic dispersant) dispersed therein is prepared.

Also, in this example, a material dispersion oil medium is prepared. Specifically, a pigment dispersion liquid is prepared by mixing 470 parts by weight of a brilliant pigment (having a volume average particle size of 5.4 μm) with 7000 parts by weight of ethyl acetate. The brilliant pigment contains fine aluminum (Al) flakes, or aluminum small pieces that have planar portions and are formed in flat plate shapes, flat shapes, or scale shapes. Hereinafter, the brilliant pigment will also be referred to as an aluminum pigment or a metallic pigment. In this example, a brilliant pigment having a volume average particle size of 5.4 μm is used. However, the volume average particle size of the brilliant pigment may be in the range of 5.3 to 5.7 μm. Also, when the material dispersion oil medium is prepared, 23 parts by weight of a charge control agent (BONTRON E-84, manufactured by Orient Chemical Industries Co., Ltd.) may be mixed to stabilize the chargeability. Volume average particle size is also referred to as volume median particle size, volume median size, or average median size.

Then, the pigment dispersion liquid is stirred while being maintained at a liquid temperature of 60° C., and added with 175 parts by weight of an ester wax (WE-4, manufactured by NOF Corporation) as a release agent, and 1670 parts by weight of polyester resin as a binder resin. The mixture is stirred until the solid dissolves. Thereby, an oil phase that is a pigment dispersion oil medium is prepared.

Then, after the liquid temperature of the aqueous phase is lowered to 55° C., the oil phase is added to the aqueous phase, and suspended by stirring for a time of 5 minutes at a rotation speed of 1000 rpm, so that particles are formed in a suspension liquid. The time and rotation speed are granulation conditions. Then, the ethyl acetate is removed by distilling the suspension liquid under reduced pressure, so that a slurry containing the particles is formed. Then, the slurry is added with nitric acid so that the pH (hydrogen-ion exponent) of the slurry is adjusted to 1.6 or lower, and is stirred. Tricalcium phosphate as a suspension stabilizer is dissolved therein, and the mixture is dehydrated, so that dehydrated particles are obtained. Then, the dehydrated particles are re-dispersed in pure water, stirred, and water-washed. After that, through dehydration, drying, and classification processes, toner base particles are obtained.

Then, in an external addition process, the toner base particles thus obtained are added and mixed with 1.5 wt % of small silica (AEROSIL RY200, manufactured by Nippon Aerosil Co., Ltd.), 2.29 wt % of colloidal silica (X-24-9163A, manufactured by Shin-Etsu Chemical Co., Ltd.), and 0.37 wt % of melamine particles (EPOSTAR S, manufactured by NIPPON SHOKUBAI CO., LTD.), so that a silver developer having a volume average particle size of 15.01 μm is obtained.

Although in the above example, the silver developer has a volume average particle size of 15.01 μm, the brilliant developer may have a volume average particle size of not less than 12.8 μm and not more than 16.9 μm.

3. Evaluation and Measurement of Developer

Next, evaluation and measurement of developer will be described. For the developer evaluation, predetermined images were printed on sheets P with silver and black developers by using the image forming apparatus 1 (see FIG. 1), and the printed products were evaluated in terms of brilliance and luminous reflectance difference ΔY. For the developer measurement, measurements were performed in terms of deposition amount, lightness, and density. The silver developer was produced by the above method.

In the evaluation, after the silver developer was put in the developer container 12 (see FIG. 2) of the image forming unit 10S corresponding to the special color of the image forming apparatus 1 (C941dn, manufactured by Oki data Corporation) (see FIG. 1), and the black developer was put in the developer container 12 (see FIG. 2) of the image forming unit 10K corresponding to black, images were printed on sheets P, and a brilliance and a luminous reflectance difference ΔY of each of the printed products were evaluated. The luminous reflectance difference ΔY refers to a difference between a luminous reflectance of the sheet P before printing and a luminous reflectance of the printed image.

Specifically, in the evaluation, coated paper sheets (OS coated paper W, having a basis weight of 127 g/m$^2$ and manufactured by Fuji Xerox Co., Ltd.) were used as the sheets P. Also, in the evaluation, the following 11 types of printing patterns were used:

- printing pattern 1, in which an image pattern (or solid image) of the silver developer having a print image density of 100% was printed by the image forming apparatus 1;
- printing pattern 2, in which a brilliance superimposition printing process was performed by the image forming apparatus 1 such that an image pattern of the black developer having a print image density of 5% was printed under an image pattern (or solid image) of the silver developer having a print image density of 100%; and
- printing patterns 3, 4, 5, 6, 7, 8, 9, 10, and 11, in which brilliance superimposition printing processes were performed by the image forming apparatus 1 such that image patterns of the black developer having print image densities of 10, 15, 20, 25, 30, 35, 40, 45, and 50% were printed under image patterns (or solid images) of the silver developer having a print image density of 100%, respectively, in the same manner as in printing pattern 2. In this embodiment, in each of printing patters 2 to 11, the silver developer image IS and black developer image IB formed on the sheet P were the same in size.

Here, the print image density refers to a value indicating, when an image is divided into pixels, the percentage of the number of pixels at which developer is transferred onto the sheet P to the total number of the pixels. For example, when a solid image is printed on the entire printable area of a predetermined region (such as the outer periphery of the photosensitive drum 36 or a surface of a print medium), or when printing is performed at a coverage rate of 100%, the print image density is 100%; when an image is printed on 1% of the printable area, or when printing is performed at a coverage rate of 1%, the print image density is 1%. The print image density DPD can be expressed by the following equation (1):

$$DPD = \frac{Cm}{Cd \times CO} \times 100, \tag{1}$$

where Cd is the number of revolutions of the photosensitive drum 36, Cm is the number of dots actually used to form an image while the photosensitive drum 36 makes Cd revolutions and is the total number of dots exposed by the LED head 14 (see FIG. 2) while the image is formed, and CO is the total number of dots per revolution of the photosensitive drum 36 (see FIG. 2), i.e., the total number of dots that can be potentially used for image formation during one revolution of the photosensitive drum 36 regardless of whether they are actually exposed. In other words, CO is the total number of dots used in formation of a solid image in which developer is transferred onto all the pixels. Thus, the value Cd×CO represents the total number of dots that can be potentially used for image formation during Cd revolutions of the photosensitive drum 36.

In the evaluation, the silver developer images of the printed products were formed using six different voltages as the bias voltage applied to the developing roller 34 of the image forming unit 10S.

3-1. Evaluation of Brilliance

Figure 5:
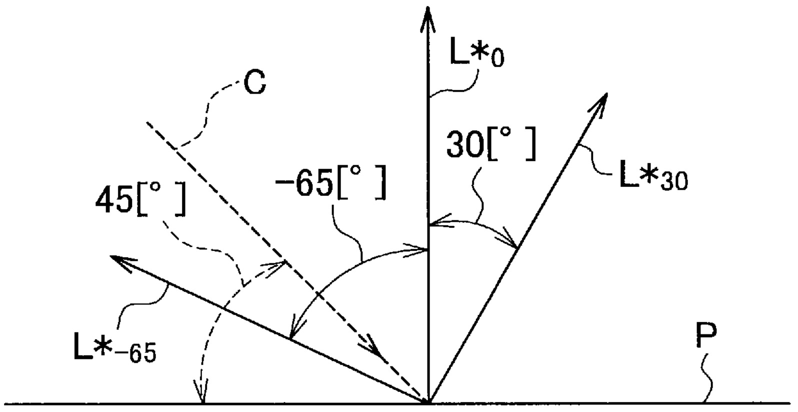
FIG. 5 is a diagram illustrating emission and reception of light by a variable angle photometer.

In the evaluation, for each printed product, the brilliance of the printed product was measured by using a variable angle photometer (GC-5000L, manufactured by Nippon Denshoku Industries Co., Ltd.). Specifically, as illustrated in FIG. 5, with the variable angle photometer, the sheet P was illuminated with a light ray C at an angle of 45° relative to the surface of the sheet P, light reflected by the sheet P was received at angles 0°, 30°, and −65° relative to the direction perpendicular to the sheet P, and lightness indexes $L^*_0$, $L^*_{30}$, and $L^*_{-65}$ were respectively calculated from the light reception results obtained at 0°, 30°, and −65°. Then, in the evaluation, the brilliance of the image was determined by calculating a flop index FI by substituting the calculated lightness indexes into the following equation (2):

$$FI = 2.69 \times \frac{(L*_{30} - L*_{-65})^{1.11}}{(L*_0)^{0.86}}. \tag{2}$$

A higher value of the flop index FI (i.e., FI value) indicates a higher brilliance, and a lower value of the flop index FI indicates a lower brilliance. Here, when the FI value is 8.0 or more, the printed product is visually perceived to have metallic luster. Thus, in the evaluation, when the FI value was 8.0 or more, the printed product was considered to have sufficient brilliance.

3-2. Evaluation of Luminous Reflectance Difference

In the evaluation, for each printed product, the luminous reflectance difference ΔY of the printed product was measured by using a spectrophotometer (CM-2600d, manufactured by KONICA MINOLTA, INC.) with a measurement diameter of 8 mm. Specifically, the luminous reflectance difference ΔY was determined by subtracting the luminous reflectance of the medium before printing from the luminous reflectance of the printed product, which was a silver printed product or silver-black printed product. In measuring the luminous reflectance of the printed product, a coated paper sheet (OS coated paper W, having a basis weight of 127 g/m$^2$ and manufactured by Fuji Xerox Co., Ltd.) that was a medium before printing was placed under the printed product. The measurements were performed with illuminant C, an observer angle of 2°, and specular component excluded (SCE).

Here, silver developer can exhibit not only its own brilliance but also its own gray appearance, in printed products. However, when the luminous reflectance difference ΔY is too small (specifically when the luminous reflectance difference ΔY is less than 30), i.e., when the printed product is similar in color to the medium before printing, the gray appearance is poor. On the other hand, when the luminous reflectance difference ΔY is too large (specifically when the luminous reflectance difference ΔY is more than 36), the printed product is too dark, and the gray appearance is poor. Thus, in the evaluation, when the luminous reflectance difference ΔY was not less than 30 and not more than 36, the printed product was considered to have sufficient gray appearance.

3-3. Measurement of Deposition Amount

In the measurement, for each of six different silver developer images and ten different black developer images, the deposition amount of the developer image was measured in a state in which the developer image was not fixed. The deposition amount, which is the amount of developer deposited on the medium, such as the sheet P, is expressed by the weight (mg) per unit area of 1 cm$^2$, and expressed in units of mg/cm$^2$. That is, the deposition amount is an index indicating how much developer is deposited on the medium (or sheet P). The deposition amount was measured and calculated by the following method.

Figure 6:
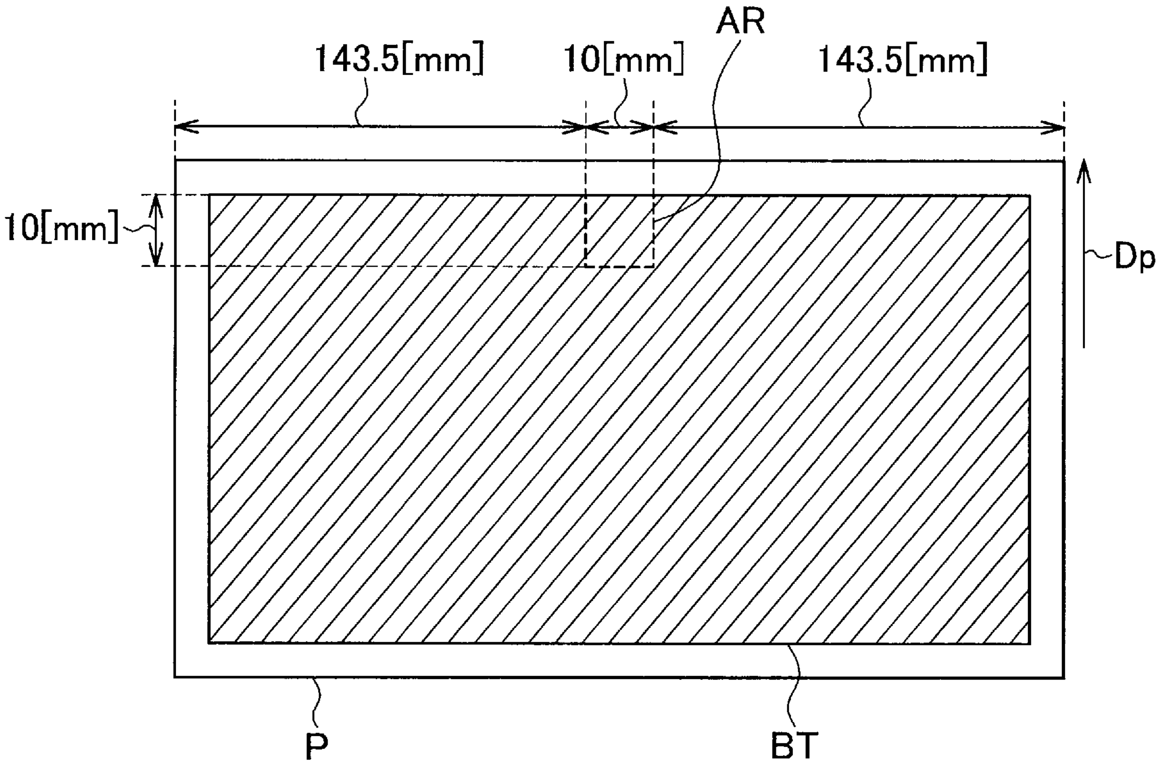
FIG. 6 is a diagram illustrating a developer measurement region in an image pattern.

A metal jig including a planar portion including a portion having an area of 1 cm$^2$ is prepared. A piece of double-sided tape is attached to the 1 cm$^2$ portion of the jig. The weight of the jig in this state is measured using an electric balance (CPA225D, manufactured by Sartorius). Then, a direct-current voltage of +300 V is applied to the jig by using an external power supply. Then, as illustrated in FIG. 6, a medium (which is a sheet P (which is a coated paper sheet (OS coated paper W, having a basis weight of 127 g/m$^2$ and manufactured by Fuji Xerox Co., Ltd.))) on which an image pattern BT (which is a developer image) is transferred is prepared. Then, developer on the medium is taken by pressing once the jig to a 10 mm square region (referred to below as a measurement region AR) of the sheet P located substantially at the center in a main scanning direction and near the leading edge in a medium conveying direction (or a sub-scanning direction) Dp. The sheet P has a length of 297 mm in the main scanning direction (which is the left-right direction in FIG. 6), which is equal to the long-side length of an A4 size sheet or the short-side length of an A3 size sheet. Then, the weight of the jig with the developer is measured using the electric balance. Then, the deposition amount (mg/cm$^2$) is obtained by calculating the difference between the weights of the jig before and after the developer sampling.

The deposition amount of a silver developer image will be referred to as the silver developer on-medium deposition amount or silver developer deposition amount. For each of the six different silver developer images, when the deposition amount (i.e., the silver developer deposition amount) of the silver developer image was measured, an image pattern BT (or solid image) of the silver developer having a print image density of 100% was printed as the silver developer image by the image forming apparatus 1 (C941dn, manufactured by Oki data Corporation) (see FIG. 1), and silver developer on the medium was taken by pressing once the jig to the image pattern BT. The image forming apparatus 1 controlled the silver developer deposition amounts by varying the bias voltage applied to the developing roller 34 from 110 to 335 V. The six different silver developer images were formed using the six different voltages as the bias voltage applied to the developing roller 34 of the image forming unit 10S, and thus had six different silver developer deposition amounts.

The deposition amount of a black developer image will be referred to as the black developer on-medium deposition amount or black developer deposition amount. When the deposition amounts (i.e., the black developer deposition amounts) of the ten different black developer images were measured, image patterns BT of the black developer having print image densities of 5, 10, 15, 20, 25, 30, 35, 40, 45, and 50% were printed as the black developer images by the image forming apparatus 1 (C941dn, manufactured by Oki data Corporation) (see FIG. 1), and for each of the image patterns BT, black developer on the medium was taken by pressing once the jig to the image pattern BT.

3-4. Measurement of Lightness

In the measurement, by using an X-Rite 528 (manufactured by X-Rite Inc.), the lightness L in the L*a*b* color space of each of black developer images IB having print image densities of 5, 10, 15, 20, 25, 30, 35, 40, 45, and 50% was measured with illuminant D50 and an observer angle of 2°.

3-5. Measurement of Density

In the measurement, by using an X-Rite 528 (manufactured by X-Rite Inc.), the OD value of each of black developer images IB having print image densities of 5, 10, 15, 20, 25, 30, 35, 40, 45, and 50% was measured as the density with illuminant D50 and status I.

4. Evaluation Results and Measurement Results

FIG. 9 shows results of the evaluation of the luminous reflectance differences ΔY and FI values of the printed products (which are silver-black printed products and silver printed products), for each of the six different silver developer deposition amounts. FIG. 10 shows results of the measurement of the black developer deposition amount, lightness, and density (i.e., OD value), for each of the print image densities of the black developer images. The print image density of a black developer image will be referred to as the black developer print image density.

As described above, a target (or desired) range of the luminous reflectance difference ΔY was set to be not less than 30 and not more than 36, and a target (or desired) range of the FI value was set to be not less than 8.0. Specifically, in the evaluation, for each of the printed products, it was determined whether the luminous reflectance difference ΔY of the printed product was within the target range, and when the luminous reflectance difference ΔY was within the target range, it was rated as "good"; otherwise, it was rated as "poor". Also, for each of the printed products, it was determined whether the FI value of the printed product was within the target range, and when the FI value was within the target rage, it was rated as "good"; otherwise, it was rated as "poor". Moreover, for each of the printed products, it was determined whether the luminous reflectance difference ΔY and FI value of the printed product were both within the respective target ranges, and when the luminous reflectance difference ΔY and FI value were both within the respective target ranges, the printed product was comprehensively rated as "good"; otherwise, it was comprehensively rated as "poor". In FIG. 9, the results of printed products that were comprehensively rated as "poor" are omitted as appropriate.

The results of FIG. 9 show that when the silver developer deposition amount is 0.13 to 0.24 mg/cm$^2$, a printed product whose luminous reflectance difference ΔY and FI value are both within the target ranges can be obtained, and when the silver developer deposition amount is 0.09 mg/cm$^2$ or not less than 0.35 mg/cm$^2$, a printed product whose luminous reflectance difference ΔY and FI value are both within the target ranges cannot be obtained. When the silver developer deposition amount was 0.13 to 0.24 mg/cm$^2$, a layer thickness of the silver developer image IS fixed to the medium was 0.51 to 0.95 μm, and the ratio of the layer thickness to the volume average particle size (which was 5.4 μm) of the brilliant pigment (which was a metallic pigment) was 9.4 to 17.6%. The layer thickness of the silver developer image IS was measured by the following method. First, the printed product (which is a silver printed product or silver-black printed product) is cut with a variable angle slicer (HW-1, manufactured by JASCO Engineering Co., Ltd.). Then, the layer thickness is calculated by observing a side of the cut printed product with a scanning electron microscope (SEM) and determining a thickness of the developer layer and inclinations of brilliant pigment particles relative to the medium.

Figure 7:
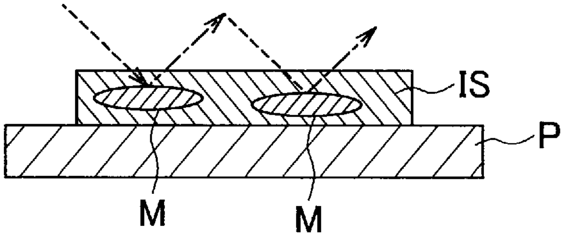
FIG. 7 is a diagram illustrating reflection of light when a silver developer deposition amount is small.
Figure 8:
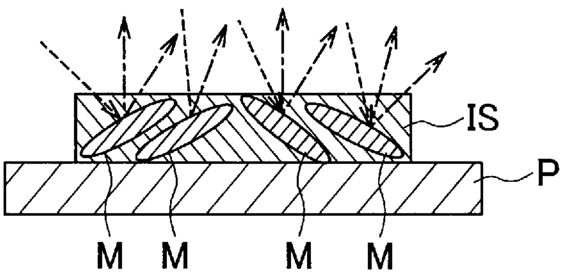
FIG. 8 is a diagram illustrating reflection of light when a silver developer deposition amount is large.

In general, it is known that, as illustrated in FIG. 7, when the silver developer deposition amount of a silver developer image IS is small, since metallic pigment particles M are arranged parallel to the medium (or sheet P), the amount of specularly reflected light is large, and the FI value is high. However, it is considered that, when the silver developer deposition amount is too small, since the amount of metallic pigment particles M capable of specular reflection is insufficient, the amount of specularly reflected light is small, and the FI value is low. On the other hand, it is considered that, as illustrated in FIG. 8, when the silver developer deposition amount of a silver developer image IS is too large, since the metallic pigment particles M are not likely to be arranged parallel to the medium (or sheet P), the amount of specularly reflected light is small, and the FI value is low. Thus, it is necessary to determine a desired range of the silver developer deposition amount.

FIG. 9 shows that the printed products having silver developer deposition amounts of 0.13, 0.19, and 0.24 mg/cm$^2$ include printed products with their luminous reflectance differences ΔY and FI values within the target ranges (i.e., comprehensively rated as "good"). Thus, a further evaluation was performed at the silver developer deposition amounts of 0.13, 0.19, and 0.24 mg/cm$^2$ as follows. At the silver developer deposition amount of 0.13 mg/cm$^2$, silver-black printed products were formed at black developer print image densities of 25.0, 27.5, 30.0, 35.0, 36.3, and 40.0%. The black developer deposition amounts were measured at the black developer print image densities of 25.0, 27.5, 30.0, 35.0, 36.3, and 40.0%. At the silver developer deposition amount of 0.19 mg/cm$^2$, silver-black printed products were formed at black developer print image densities of 29.8, 30.0, 34.2, 36.0, and 36.6%. The black developer deposition amounts were measured at the black developer print image densities of 29.8, 30.0, 34.2, 36.0, and 36.6%. At the silver developer deposition amount of 0.24 mg/cm$^2$, silver-black printed products were formed at black developer print image densities of 20.0, 20.4, 25.0, 29.0, and 30.0%. The black developer deposition amounts were measured at the black developer print image densities of 20.0, 20.4, 25.0, 29.0, and 30.0%. For each of the silver-black printed products, the luminous reflectance difference ΔY and FI value were each evaluated and comprehensively evaluated, and the ratio (referred to as the developer deposition amount ratio) of the black developer deposition amount to the silver developer deposition amount was calculated. FIG. 11 shows the results of the further evaluation.

To regulate the luminous reflectance difference ΔY and FI value of the silver-black printed product within the specific ranges, it is necessary to regulate the developer deposition amount ratio within a specific range. It can be seen that the specific range of the developer deposition amount ratio depends on the value of the silver developer deposition amount. At the silver developer deposition amount of 0.13 mg/cm$^2$, the range of the developer deposition amount ratio in which the luminous reflectance difference ΔY and FI value were both within the target ranges was 0.14 to 0.23. At the silver developer deposition amount of 0.19 mg/cm$^2$, the range of the developer deposition amount ratio in which the luminous reflectance difference ΔY and FI value were both within the target ranges was 0.09 to 0.17. At the silver developer deposition amount of 0.24 mg/cm$^2$, the range of the developer deposition amount ratio in which the luminous reflectance difference ΔY and FI value were both within the target ranges was 0.068 to 0.10.

Figure 12:
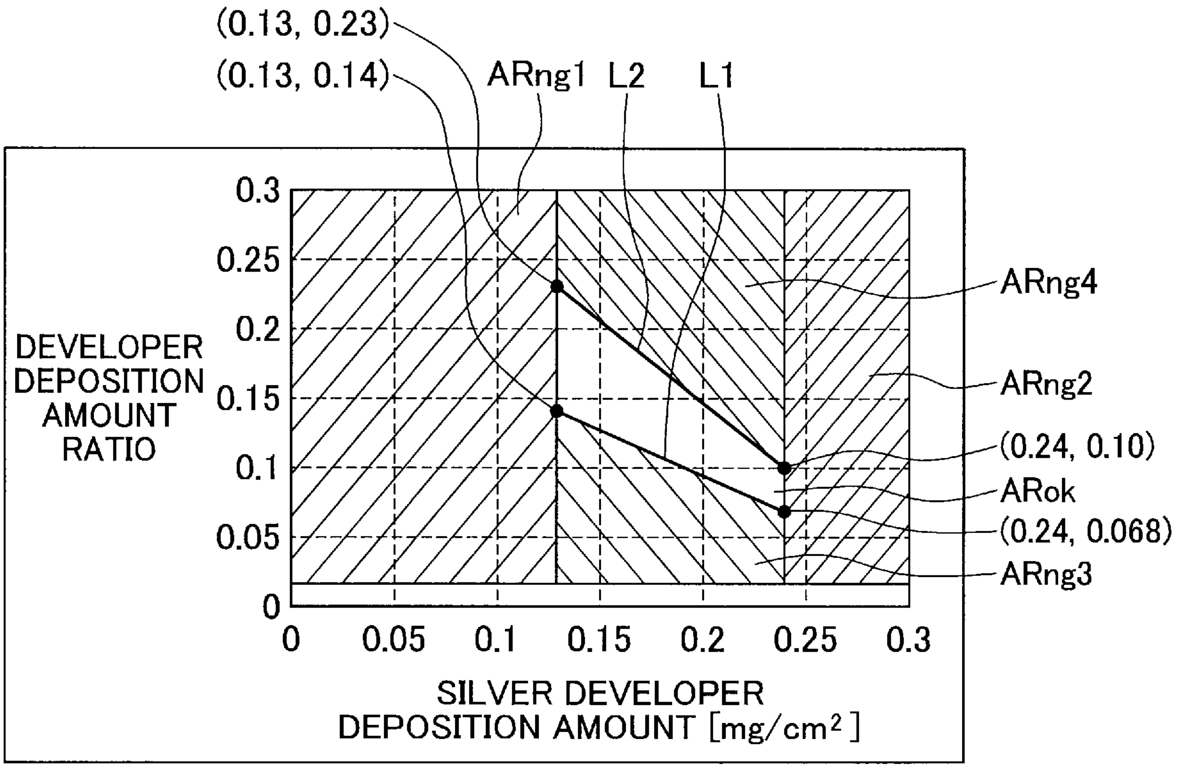
FIG. 12 is a graph showing a relationship between a silver developer deposition amount and a developer deposition amount ratio.

FIG. 12 is a graph obtained from the results of FIG. 11. The graph has an x-axis representing the silver developer deposition amount and a y-axis representing the developer deposition amount ratio, and shows a region in which silver-black printed products with their luminous reflectance differences ΔY and FI values within the target ranges were obtained.

In FIG. 12, straight line L1 is a straight line connecting the coordinates of a silver developer deposition amount of 0.13 $mg/cm^2$ and a developer deposition amount ratio of 0.14, at which the comprehensive evaluation is "good" in FIG. 11, and the coordinates of a silver developer deposition amount of 0.24 $mg/cm^2$ and a developer deposition amount ratio of 0.068, at which the comprehensive evaluation is "good" in FIG. 11. Straight line L1 is expressed by $y=-0.6545455x+0.2250909$.

Also, in FIG. 12, straight line L2 is a straight line connecting the coordinates of a silver developer deposition amount of 0.13 $mg/cm^2$ and a developer deposition amount ratio of 0.23, at which the comprehensive evaluation is "good" in FIG. 11, and the coordinates of a silver developer deposition amount of 0.24 $mg/cm^2$ and a developer deposition amount ratio of 0.10, at which the comprehensive evaluation is "good" in FIG. 11. Straight line L2 is expressed by $y=-1.1818182x+0.3836364$.

FIG. 12 shows that, in good region ARok, which is a region in which the silver developer deposition amount is not less than 0.13 $mg/cm^2$ and not more than 0.24 $mg/cm^2$ and that is defined by straight lines L1 and L2, silver-black printed products having luminous reflectance differences ΔY and FI values within the target ranges are obtained.

Poor regions ARng1, ARng2, ARng3, and ARng4, which are outside the good region ARok, will be described below. In poor region ARng1, since the silver developer deposition amount is insufficient, the FI value of the printed product is less than 8.0. In poor region ARng2, since the silver developer deposition amount is too large and the metallic pigment particles (or silver pigment particles) M (see FIG. 8) are improperly arranged, the FI value of the printed product is less than 8.0. In poor region ARng3, since the ratio of the black developer deposition amount to the silver developer deposition amount, i.e., the ratio of the amount of black developer to the amount of silver developer, is low, the density is insufficient, and the luminous reflectance difference ΔY is less than 30. In poor region ARng4, since the ratio of the black developer deposition amount to the silver developer deposition amount, i.e., the ratio of the amount of black developer to the amount of silver developer, is high, the density is too high, and the luminous reflectance difference ΔY is more than 36.

In view of the above evaluation results, when the image forming apparatus 1 performs a silver developer printing process with a specific silver developer deposition amount, the image forming apparatus 1 automatically changes the printing process to the brilliance superimposition printing process (which is a superimposition printing process with black developer) and controls each of the silver developer deposition amount and black developer deposition amount.

When the controller 3 performs a silver developer printing process, the controller 3 determines a silver developer deposition amount included in an image (i.e., image data) to be printed, by performing a predetermined arithmetic process on the basis of the image to be printed. Then, the controller 3 automatically performs a brilliance superimposition printing process (which is a superimposition printing process with silver developer and black developer). Here, a silver developer image is superimposed on a black developer image. The controller 3 determines the silver developer deposition amount and black developer deposition amount so that the silver developer deposition amount is within a specified range and the developer deposition amount ratio is within a specified range.

Specifically, the controller 3 stores, in a predetermined storage unit (not illustrated), a control table in which a condition of the silver developer deposition amount and a condition of the developer deposition amount ratio are associated with each other, and controls the silver developer deposition amount and black developer deposition amount on the basis of the control table. At this time, the controller 3 controls the silver developer deposition amount by changing the bias voltage applied to the developing roller 34. Also, the controller 3 controls the black developer deposition amount by changing the black developer print image density.

Here, the silver developer deposition amount and developer deposition amount ratio are required to be within good region ARok, in which the silver developer deposition amount is not less than 0.13 $mg/cm^2$ and not more than 0.24 $mg/cm^2$ and which is defined by straight lines L1 and L2 in FIG. 12, as described above.

5. Functional Configuration of Image Forming Apparatus

Figure 13:
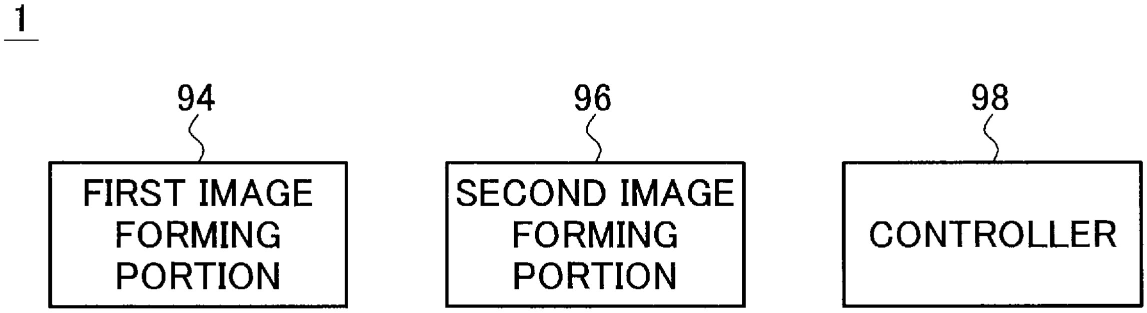
FIG. 13 is a block diagram illustrating a functional configuration of the image forming apparatus.

FIG. 13 is a functional block diagram illustrating basic functions of the image forming apparatus 1 relating to the brilliance superimposition printing process.

The image forming apparatus 1 includes a first image forming portion 94, a second image forming portion 96, and a controller 98.

The first image forming portion 94, which corresponds to the image forming unit 10S (see FIG. 1), is configured to form a silver developer image IS as a brilliant developer image with the silver developer as a brilliant developer. The second image forming portion 96, which corresponds to or includes the image forming unit 10K (see FIG. 1), is configured to form a black developer image IB as a developer image with the black developer as a non-brilliant developer.

The controller 98, which corresponds to the controller 3 (see FIG. 1), is configured to control operation of the first image forming portion 94 and second image forming portion 96 in accordance with received print data, and when causing a silver developer image IS to be formed on a sheet P in accordance with the print data by the first image forming portion 94, cause a black developer image IB to be formed between the silver developer image IS and the sheet P as a medium by the second image forming portion 96.

6. Advantages, Etc

When the silver developer deposition amount on the sheet P is small, the FI value is high, but the luminous reflectance difference ΔY is low. On the other hand, when the silver developer deposition amount on the sheet P is large, the luminous reflectance difference ΔY is high, but the FI value is low. Thus, although in order to increase the luminous reflectance difference ΔY, the silver developer deposition amount on the sheet P should be increased, the FI value decreases as the silver developer deposition amount increases. Thus, the FI value and luminous reflectance difference ΔY have a trade-off relationship, and it has been difficult to achieve both a high brilliance (or FI value) and a high luminous reflectance difference ΔY.

Thus, when the image forming apparatus 1 (see FIG. 1) receives print data for a silver monochromatic image, instead of forming only a silver developer image IS consisting of silver developer on a sheet P, the image forming apparatus 1 forms a black developer image IB consisting of black developer under a silver developer image IS (or between a silver developer image IS and a sheet P) while controlling the silver developer deposition amount and black developer deposition amount.

Thereby, while restricting the silver developer deposition amount to prevent the FI value from decreasing, the image forming apparatus 1 can supplement (or increase) the luminous reflectance difference ΔY by means of the black developer image IB. Thereby, the image forming apparatus 1 can produce a silver printed product whose brilliance (or FI value) and luminous reflectance difference ΔY are both high. In this manner, the image forming apparatus 1 can form an image having both a desired metallic luster appearance (or FI value) and a desired color (or luminous reflectance difference ΔY).

Also, the image forming apparatus 1 makes the black developer deposition amount less than the silver developer deposition amount by making the black developer print image density less than the silver developer print image density.

In the case of decreasing the black developer deposition amount by decreasing the bias voltage applied to the developing roller 34 of the image forming unit 10K while setting the black developer print image density to 100% as with the silver developer print image density, it is difficult to form the black developer image IB in the form of a uniform thin layer with high accuracy, and print defects are likely to occur in the black developer image IB.

On the other hand, the image forming apparatus 1 makes the print image density of the black developer image IB less than the print image density of the silver developer image IS by setting the black developer print image density to a value of 5 to 50%, which is less than the silver developer print image density of 100%, thereby making the black developer deposition amount less than the silver developer deposition amount. Thus, by only performing a simple control of decreasing the black developer print image density, the image forming apparatus 1 can decrease the black developer deposition amount while preventing print defects from occurring in the black developer image IB. Thereby, the image forming apparatus 1 can produce a printed product whose FI value and luminous reflectance difference ΔY are both high while preventing print defects.

Moreover, the image forming apparatus 1 produces a silver-black printed product such that the silver developer deposition amount and developer deposition amount ratio are included in good region ARok of FIG. 12.

By producing a silver-black printed product such that the above condition is satisfied, the image forming apparatus 1 can provide a silver-black printed product with high quality that has an FI value not less than 8.0 (i.e., within the target range) and a luminous reflectance difference ΔY not less than 30 and not more than 36 (i.e., within the target range), and has both a high brilliance (or FI value) and a desired luminous reflectance difference ΔY.

The image forming apparatus 1 may produce a silver-black printed product such that the silver developer deposition amount and developer deposition amount ratio satisfy the following formulae (3) and (4):

$$0.068 \leq R \leq 0.23, \quad (3)$$

$$0.13 \leq A \leq 0.24, \quad (4)$$

where R is the developer deposition amount ratio, and A is the silver developer deposition amount.

As above, the image forming apparatus 1 includes the first image forming portion 94 configured to form a silver developer image IS with the silver developer, the second image forming portion 96 including at least one image forming unit 10 configured to form a black developer image IB with at least one color developer, and the controller 3 configured to control operation of the first image forming portion 94 and second image forming portion 96 in accordance with received print data. When the controller 3 causes a silver developer image IS to be formed on a sheet P in accordance with print data by the first image forming portion 94, the controller 3 causes a black developer image IB to be formed between the silver developer image IS and the sheet P.

Thereby, while restricting the silver developer deposition amount to prevent the FI value from decreasing, the image forming apparatus 1 can supplement (or increase) the luminous reflectance difference ΔY by means of the black developer image IB.

With the present disclosure, it is possible, while restricting the amount of developer per unit area of the brilliant developer image to prevent the FI value from decreasing, to supplement (or increase) the luminous reflectance difference by means of the black developer image.

With the present disclosure, it is possible to provide an image forming apparatus capable of forming an image having both a desired metallic luster appearance and a desired color.

7. Other Embodiments

In the above embodiment, the black developer image IB is formed with black developer alone. However, this is not mandatory, and the black developer image IB may be formed with process black by combining yellow, magenta, and cyan developers, which are non-brilliant developers, as developers of different colors. In this case, the second image forming portion 96 (see FIG. 13) corresponds to or includes the image forming units 10C, 10M, and 10Y (see FIG. 1). Also, the black developer image IB may be formed with process black by combining yellow, magenta, cyan, and black developers, which are non-brilliant developers. In this case, the second image forming portion 96 (see FIG. 13) corresponds to the image forming units 10C, 10M, 10Y, and 10K (see FIG. 1).

For example, when an image equivalent to an image formed with black developer alone and having a print image density of 30% is formed with process black, the process black is produced with yellow, magenta, and cyan developer images each having a print image density of 20%. Thus, when the same black is expressed, the amount of developer deposited on the sheet P in the case of using process black is larger than that in the case of using black developer alone. Thus, when the surface of the sheet P is rough, it is preferable to use process black rather than black developer alone, in order to smooth the surface. In addition, it is also possible to select one of black developer and process black depending on the remaining amounts of the developers of the respective colors. For example, when the remaining amount of black developer contained in the developer container 12 of the image forming unit 10K is small, the black developer image may be formed with process black.

Also, in the above embodiment, in the developer evaluation, the silver developer image IS and black developer image IB formed on the sheet P have the same size. However, this is not mandatory, and the area of the black developer image IB may be made smaller than the area of the silver developer image IS so that even when the images are displaced from each other, the black developer image IB is not likely to protrude out of the silver developer image IS.

Moreover, in the above embodiment, the black developer image IB is placed between the sheet P and the silver developer image IS in such a manner as to be superimposed on the silver developer image IS. However, this is not mandatory, and one or more various developer images, such as a clear developer image, other than the silver developer image IS and black developer image IB may be placed at one or each of a position between the silver developer image IS and the black developer image IB and a position between the black developer image IB and the sheet P.

Moreover, in the above embodiment, the silver developer deposition amount is controlled by changing the bias voltage applied to the developing roller 34 of the image forming unit 10S. However, this is not mandatory, and the silver developer deposition amount may be controlled by changing the bias voltage applied to the second supply roller 33 or changing the print image density of the silver developer image.

Moreover, in the above embodiment, the black developer deposition amount is controlled by changing the black developer print image density. However, this is not mandatory, and the black developer deposition amount may be controlled by changing the bias voltage applied to the developing roller 34 of the image forming unit 10K or changing the bias voltage applied to the second supply roller 33.

Moreover, in the above embodiment, the aluminum (Al) particles contained in the brilliant pigment used in producing the developer are fine flakes having planar portions. However, this is not mandatory, and the aluminum (Al) particles may be, for example, small pieces having various shapes, such as spherical shapes or rod shapes.

Moreover, in the above embodiment, the metal contained in the brilliant pigment used in producing the developer is aluminum (Al). However, this is not mandatory, and the metal may be various types of metals, such as brass or iron oxide. In this case, when the developer is fixed to a sheet P, the color exhibited by the developer depends on the metal.

Moreover, in the above embodiment, a silver developer is used as an example of the brilliant developer. However, this is not mandatory, and a gold developer may be used as an example of the brilliant developer. In this case, the gold developer may be produced by the following production method. While in the above embodiment, the silver developer is produced by adding aluminum particles as a brilliant pigment during the production, the gold developer is produced by adding, in addition to aluminum particles, a yellow pigment (here, C.I. Pigment Yellow 180, which is an organic pigment), a magenta pigment (here, C.I. Pigment Red 122, which is an organic pigment), a reddish-orange fluorescent pigment (FM-34N Orange, manufactured by Sinloihi Co., Ltd.), and a yellow fluorescent pigment (FM-35N Yellow, manufactured by Sinloihi Co., Ltd.).

Moreover, in the above embodiment, the deposition amount of an image pattern BT (see FIG. 6) is measured on a medium (or sheet P) on which the image pattern BT is transferred. However, this is not mandatory, and the deposition amount may be measured on the photosensitive drum 36, the intermediate transfer belt 44, or the like before the image pattern BT is transferred onto a sheet P.

Moreover, in the above embodiment, the present disclosure is applied to developers used for a one-component development system. However, this is not mandatory, and the present disclosure may be applied to developers used for a two-component development system in which carrier and toner are mixed, and an appropriate amount of charge is imparted to the toner by using friction between the carrier and the toner.

Moreover, in the above embodiment, the image forming apparatus 1 is of an intermediate transfer system (or secondary transfer system), and sequentially transfers developer images of the respective colors from the photosensitive drums 36 of the image forming units 10 onto the intermediate transfer belt 44 such that the developer images are superimposed on each other, and transfers the developer images from the intermediate transfer belt 44 to a sheet P. However, this is not mandatory, and the image forming apparatus 1 may be of a direct transfer system, and may be configured to sequentially transfer developer images of the respective colors from the photosensitive drums 36 of the image forming units 10 onto a sheet P as a medium such that the developer images are superimposed on each other.

Moreover, in the above embodiment, the image forming apparatus 1 (see FIG. 1) is provided with five image forming units 10. However, this is not mandatory, and the image forming apparatus 1 may be provided with four or less or six or more image forming units 10.

Moreover, in the above embodiment, the image forming apparatus 1 is a single function printer. However, this is not mandatory, and the present disclosure may be applied to image forming apparatuses having other various functions, such as multi-function peripherals (MFPs) having a copier function and a facsimile function.

Moreover, in the above embodiment, the present disclosure is applied to the image forming apparatus 1. However, this is not mandatory, and the present disclosure may be applied to various electronic devices, such as copiers, that form images on media, such as paper sheets, with developer by electrophotography.

The present disclosure is not limited to the above embodiments. Specifically, the scope of the present disclosure covers embodiments obtained by arbitrarily combining some or all of the above embodiments. Also, the scope of the present disclosure covers embodiments obtained by extracting part of the configuration described in one of the above embodiments and replacing part of the configuration of another of the above embodiments with the extracted part, and embodiments obtained by extracting part of the configuration described in one of the above embodiments and adding the extracted part to another of the above embodiments.

Moreover, in the above embodiment, the image forming apparatus 1 as an image forming apparatus is constituted by a first image forming portion 94 as a first image forming portion, the second image forming portion 96 as a second image forming portion, and the controller 98 as a controller. However, this is not mandatory, and an image forming apparatus may be constituted by a first image forming portion, a second image forming portion, and a controller that have other configurations.

The present disclosure can be used in forming an image on a medium with a developer containing a metallic pigment by electrophotography.

What is claimed is:

1. An image forming apparatus, comprising:
a first image forming portion configured to form a brilliant developer image with a brilliant developer;
a second image forming portion including at least one image forming portion configured to form a developer image with at least one non-brilliant developer; and
a controller configured to control operation of the first image forming portion and the second image forming portion in accordance with received print data,
wherein when the controller causes the brilliant developer image to be formed on a medium in accordance with the print data by the first image forming portion, the controller causes a black developer image to be formed between the brilliant developer image and the medium by the second image forming portion, and
wherein when the controller causes the brilliant developer image to be formed on the medium in accordance with the print data, the controller performs control to cause the black developer image to be formed between the brilliant developer image and the medium such that an amount of developer per unit area of the black developer image is less than an amount of developer per unit area of the brilliant developer image.

2. An image forming apparatus, comprising:
a first image forming portion configured to form a brilliant developer image with a brilliant developer;
a second image forming portion including at least one image forming portion configured to form a developer image with at least one non-brilliant developer; and
a controller configured to control operation of the first image forming portion and the second image forming portion in accordance with received print data,
wherein when the controller causes the brilliant developer image to be formed on a medium in accordance with the print data by the first image forming portion, the controller causes a black developer image to be formed between the brilliant developer image and the medium by the second image forming portion, and
wherein the controller performs control to cause the black developer image to be formed between the brilliant developer image and the medium such that a print image density of the black developer image is less than a print image density of the brilliant developer image.

3. An image forming apparatus, comprising:
a first image forming portion configured to form a brilliant developer image with a brilliant developer;
a second image forming portion including at least one image forming portion configured to form a developer image with at least one non-brilliant developer; and
a controller configured to control operation of the first image forming portion and the second image forming portion in accordance with received print data,
wherein when the controller causes the brilliant developer image to be formed on a medium in accordance with the print data by the first image forming portion, the controller causes a black developer image to be formed between the brilliant developer image and the medium by the second image forming portion, and
wherein when the controller performs control to cause the black developer image to be formed between the brilliant developer image and the medium, the controller performs control so that a ratio R of an amount of developer per unit area of the black developer image to an amount of developer per unit area of the brilliant developer image satisfies $$0.068 \leq R \leq 0.23.$$

4. The image forming apparatus of claim 3, wherein when the controller performs control to cause the black developer image to be formed between the brilliant developer image and the medium, the controller performs control so that an amount A of developer per unit area of the brilliant developer image satisfies $$0.13\ \text{mg/cm}^2 \leq A \leq 0.24\ \text{mg/cm}^2.$$

5. The image forming apparatus of claim 3, wherein the black developer image is formed with a black developer.

6. The image forming apparatus of claim 5, wherein the at least one non-brilliant developer includes the black developer, and the at least one image forming portion of the second image forming portion includes an image forming portion configured to form the black developer image with the black developer.

7. The image forming apparatus of claim 3, wherein the black developer image is formed with a plurality of developers of different colors.

8. The image forming apparatus of claim 7, wherein the at least one non-brilliant developer includes the plurality of developers of different colors, and the at least one image forming portion of the second image forming portion includes a plurality of image forming portions configured to form the black developer image with the plurality of developers of different colors.

9. The image forming apparatus of claim 8, wherein none of the plurality of developers of different colors is a black developer.

10. The image forming apparatus of claim 3, wherein the first image forming portion further comprises a carrier together with the developer.

11. The image forming apparatus of claim 3, wherein the second image forming portion further comprises a carrier together with the developer.

12. The image forming apparatus of claim 3, wherein the brilliant developer includes a metallic pigment and a binder resin.

13. The image forming apparatus of claim 12, wherein the metallic pigment has a volume average particle size of not less than 5.3 μm and not more than 5.7 μm.

14. The image forming apparatus of claim 3, wherein the brilliant developer has a volume average particle size of not less than 12.8 μm and not more than 16.9 μm.

15. The image forming apparatus of claim 2, wherein the brilliant developer has a volume average particle size of not less than 12.8 μm and not more than 16.9 μm.

16. The image forming apparatus of claim 2, wherein when the controller performs control to cause the black developer image to be formed between the brilliant developer image and the medium, the controller performs control so that an amount A of developer per unit area of the brilliant developer image satisfies $$0.13\ \text{mg/cm}^2 \leq A \leq 0.24\ \text{mg/cm}^2.$$

17. The image forming apparatus of claim 2, wherein the brilliant developer includes a metallic pigment and a binder resin, and the metallic pigment has a volume average particle size of not less than 5.3 μm and not more than 5.7 μm.

18. The image forming apparatus of claim 1, wherein the brilliant developer has a volume average particle size of not less than 12.8 μm and not more than 16.9 μm.

19. The image forming apparatus of claim 1, wherein when the controller performs control to cause the black developer image to be formed between the brilliant developer image and the medium, the controller performs control so that an amount A of developer per unit area of the brilliant developer image satisfies $$0.13\ \mathrm{mg/cm^2} \le A \le 0.24\ \mathrm{mg/cm^2}.$$

20. The image forming apparatus of claim 1, wherein the brilliant developer includes a metallic pigment and a binder resin, and the metallic pigment has a volume average particle size of not less than 5.3 μm and not more than 5.7 μm.

* * * * *